June 19, 1923.
W. C. MEREDITH
MULTIPLE CONDUIT
Filed Sept. 7, 1922
1,459,476
2 Sheets-Sheet 1
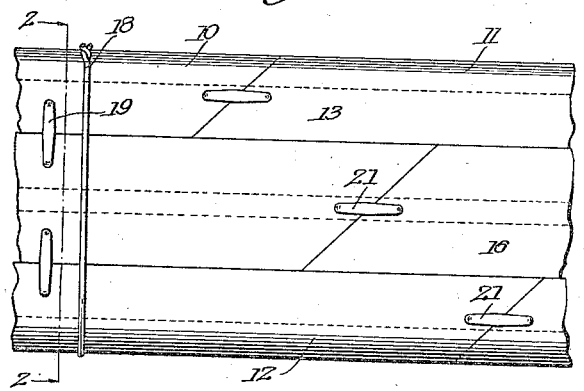
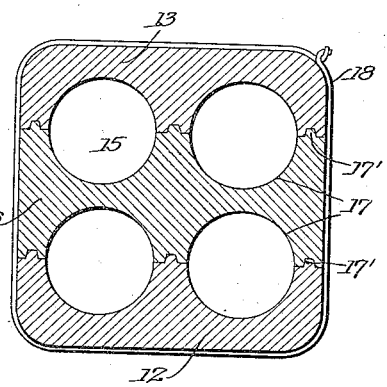
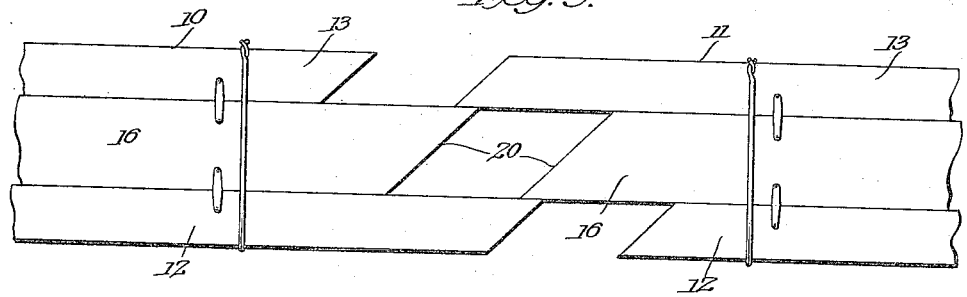
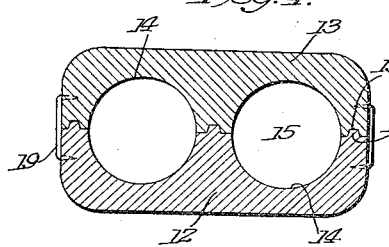
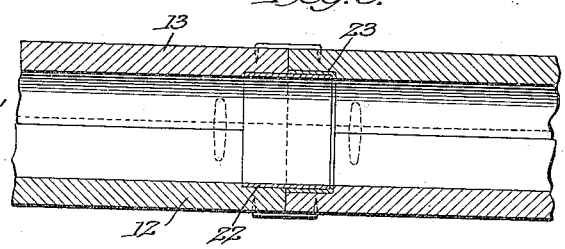
Inventor
W. C. Meredith
By Cushman, Bryant & Darby
Attorneys June 19, 1923.
W. C. MEREDITH
MULTIPLE CONDUIT
Filed Sept. 7, 1922
1,459,476
2 Sheets-Sheet 2
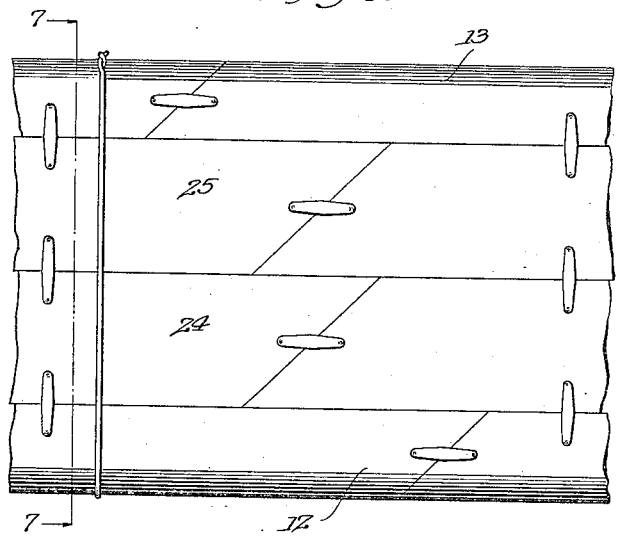
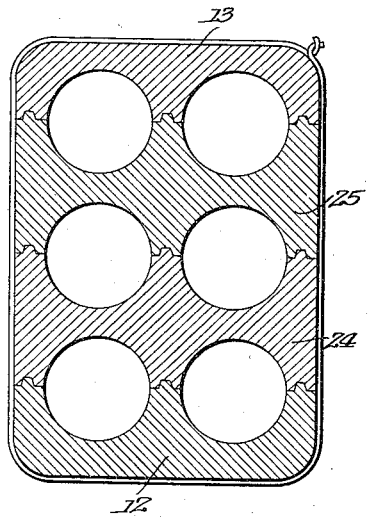
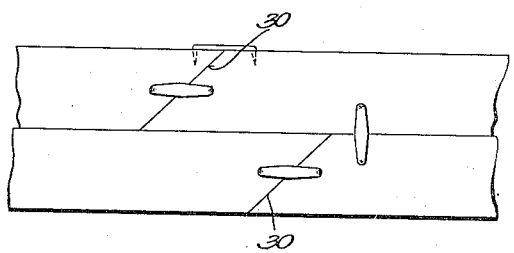
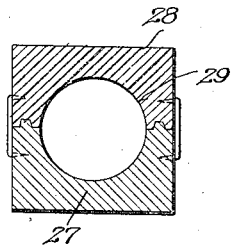
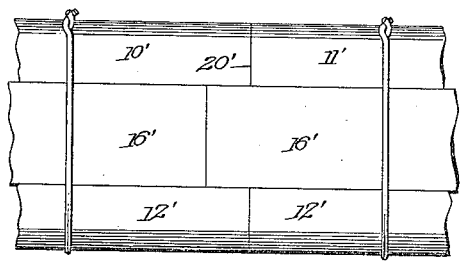
Inventor
W. C. Meredith Patented June 19, 1923.

1,459,476

UNITED STATES PATENT OFFICE.

WILLIAM C. MEREDITH, OF ATLANTA, GEORGIA.

MULTIPLE CONDUIT.

Application filed September 7, 1922. Serial No. 586,703.

*To all whom it may concern:*

Be it known that I, WILLIAM C. MEREDITH, a citizen of the United States, residing at Atlanta, in the county of Fulton and State of Georgia, have invented new and useful Improvements in Multiple Conduits, of which the following is a specification.

This invention relates to conduits of sectional or knock-down construction, which are constructed, preferably, of wood and are provided with suitable bores or ducts adapted to receive pipes or wires which must be laid underground.

This application is a continuation in part of my pending application, Serial No. 436,994, filed Jan. 13, 1921, relating to interlocking wooden conduits. An object of the present invention is to construct the conduit of sections which may be cheaply manufactured and quickly assembled.

A further object of the invention relates to the manner of joining the several sections of the conduit and has to do with the provision of means for obtaining a section joint which is water-proof and substantially air-tight.

An additional aim is to provide a conduit section of standard construction and formed of a plurality of parts, the parts being joined in such a way that the section may be decreased or augmented in size to vary selectively the number of individual ducts or bores therein.

Other objects of the invention, such as the provision of a conduit which is of durable and rigid construction, which may be readily transported and produced with a relatively small amount of machine work, relate more closely to the details of construction of the embodiment of the invention disclosed in the accompanying drawings, and which will be described in detail.

In the drawings:—

Fig. 1 is a side elevational view of one form of a device which the invention may take, Fig. 2 is a cross sectional view on line 2—2 of Fig. 1 looking in the direction of the arrows, Fig. 3 is a view similar to Fig. 1 showing the two sections slightly separated and before they are joined together, Fig. 4 is a cross section similar to Fig. 2 showing the filler member removed in order to decrease the number of bores or ducts, Fig. 5 is a longitudinal section taken through the center of one of the ducts showing an improved method of joining the sections, Fig. 6 is a side elevational view showing a conduit slightly larger than the conduit shown in Fig. 1, Fig. 7 is a cross section on the line 7—7 of Fig. 6 looking in the direction of the arrows, Fig. 8 is a side elevational view of a one-duct conduit and showing two sections joined, Fig. 9 is a cross section of the conduit shown in Fig. 8, and Fig. 10 is a side elevational view showing a slightly modified joint between the sections.

Referring to the drawings for a more detailed description, and considering more particularly Figs. 1, 2 and 3, the conduit is constructed in sections joined end to end in a manner which will insure permanent connection between the sections and at the same time permit ready assembly of the conduit. Two sections are designated in Fig. 3 by the numerals 10 and 11, and each section is formed of two outside members 12, 13 having grooves 14 in their respective faces which, when the two members are arranged as shown in Fig. 4 with the grooves opposed, form ducts or bores 15 adapted to receive a cable or pipe. If each member is provided with a pair of grooves and the two members are arranged face to face, only two ducts will be provided.

The invention contemplates, however, a conduit of elastic or expansible construction whereby the number of bores may be multiplied or augmented as desired. For this purpose, the ducts may be increased to four by the provision of a filler member 16 having in its opposite faces bore forming grooves 17 adapted to register with the grooves in the outside members to form the additional number of closed ducts or bores.

It is desirable that the parts of each section be united in such a way that water and foreign matter cannot obtain access to the ducts. For this purpose any suitable type of joint may be employed, and in the present instance the outside member 12 has a plurality of tongues 12' which fit into grooves 13' in the face of the outer member 13 as shown in Fig. 4. The filler member 17 is provided on its opposite faces with tongues and grooves 17' adapted to cooperate with the tongues and grooves in the outside members as shown in Fig. 2. It will be noted that by this arrangement the filler member may be used or eliminated, as required, since the tongues and grooves are arranged upon the individual members in such a way that the outside members may be arranged face to face or separated by means of the filler member.

The members may be held together by means of wire bands 18 encircling the sections at intervals and may be additionally secured by means of U-shaped fasteners 19 arranged as shown in Figs. 1 and 4.

As will be noted from an inspection of Figs. 1, 3 and 10 the sections are united so as to form, preferably, an overlapping joint. In the form shown in Figs. 1 and 3 the members of each section are provided with oblique ends 20 which are offset to form zigzag section ends. In Fig. 10 the sections 10', 11' etc. are provided with straight ends 20 which are offset so as to form an overlapping joint between the sections. In each of the forms above described the bottom members 12 and 12' of sections 10 and 10' extend further to the right than the filler members 16, 16' whereas the bottom members of sections 11, 11' do not extend as far to the left as the filler members 16, 16'. This arrangement permits of the overlapping section joints. When the ends of the members of each section are cut straight, as in Fig. 10, the ends of each section are of irregular or stepped construction, whereas, when they are cut on oblique lines, as in Figs. 1 and 3, they have a stepped zigzag formation. The ends of the meeting members (Fig. 1) may be secured together by fasteners 21 and the individual ducts may be made waterproof at the joints by means of thimbles 22, 23 (Fig. 5) fitting in the duct of the adjoining sections and arranged in telescopic relation.

Referring to Figs. 6 and 7, a conduit is shown comprising the usual outer members 12 and 13 and two filler members 24 and 25. This clearly indicates the manner in which the sizes of the conduit, and more particularly the number of ducts, may be increased. Obviously, as many filler members may be supplied as is desired since the tongue and groove joints between the same are readily formed, each filler member being provided with tongues upon one face and grooves upon the other, to effect the joints, and bore forming grooves in its opposite faces. Of course, the members may be made of greater width than shown so that the number of bore forming grooves in each member may be increased considerably beyond the number shown, and such variation clearly comes within the scope of the invention. However, such a manner of providing for increase in the size of the conduit is not as practicable as that shown for the reason that the stock employed must be of greater width, and such stock is not as readily obtainable.

In Figs. 8 and 9 there is shown a further modification of the invention to indicate the manner in which a single duct conduit is constructed. The duct comprises members 27, 28 having cooperating bore forming grooves 29 in their meeting faces, the joints between the members of each section being of the tongue and groove type, as shown in the other views above described. Each member is provided with oblique ends 30 arranged in zigzag and stepped relation to form overlapping joints shown in Fig. 8; obviously, the ends of the members may be cut straight, as in Fig. 10, when desired. The number of ducts in this conduit may be increased without varying the character of the members 27 and 28 by providing filler members similar to those shown in Figs. 2 and 7 but having merely one bore forming groove in each face.

This conduit may be laid in any suitable manner, either with a concrete bottom or base and plank top, or with the base and sides formed entirely of concrete. After cutting out the sections and their individual members it is not infrequently desirable to treat them with creosote or other waterproofing composition since this materially lengthens the life of the conduit and forms an altogether more satisfactory conduit for underground work.

It should be understood that numerous modifications may be made in the illustrated and described structure without departing from the scope of the invention, which is more definitely defined in the following claims.

I claim:

1. A wooden conduit section comprising outer members having smooth outer surfaces and having on their inner surfaces longitudinal grooves, each of said members being of substantially integral construction, a filler member longitudinally grooved on its opposite faces and adapted to be positioned between said outer members with its grooves in registration with the grooves of said members thereby to form a section having a plurality of bores, cooperating tongues and grooves on the meeting faces of said members at the side of said bore grooves, and bands encircling said members to hold them together to form a portable unit.

2. As an article of manufacture, a wooden conduit section formed of integral wooden members and comprising outer members having on their inner surfaces longitudinal grooves, a filler member longitudinally grooved on its opposite faces and adapted to be positioned between said outer members with its grooves in registration with the grooves of said members thereby to form a section having a plurality of bores, cooperating tongues and grooves on the meeting faces of said members at the sides of said bore grooves, and means holding said members together to form a portable unit.

3. As an article of manufacture, a wooden conduit section formed of integral wooden members and comprising outer members having on their inner surfaces longitudinal grooves, a filler member longitudinally grooved on its opposite faces and adapted to be positioned between said outer members with its grooves in registration with the grooves of said members thereby to form a section having a plurality of bores, cooperating tongues and grooves on the meeting faces of said members at the sides of said bore grooves, and means encircling said members and holding them together in a portable unit.

In testimony whereof I have hereunto set my hand.

WILLIAM C. MEREDITH.